United States Patent [19]
Hamby

[11] 3,860,782
[45] Jan. 14, 1975

[54] WELDING MACHINE
[75] Inventor: Bill Lee Hamby, Newhall, Calif.
[73] Assignee: Sterling Electronics Corporation, Westlake Village, Calif.
[22] Filed: Aug. 12, 1971
[21] Appl. No.: 171,095

[52] U.S. Cl................................. 219/89, 219/85
[51] Int. Cl............................................ H01c 5/00
[58] Field of Search .................. 219/86, 89, 78, 91

[56] References Cited
UNITED STATES PATENTS

| | | | |
|---|---|---|---|
| 2,892,068 | 6/1959 | Park et al. | 219/89 X |
| 3,342,972 | 9/1967 | Ponberg | 219/86 X |
| 3,400,242 | 9/1968 | Waller | 219/86 X |
| 3,660,631 | 5/1972 | Conley | 219/86 X |

*Primary Examiner*—C. L. Albritton
*Attorney, Agent, or Firm*—Christie, Parker & Hale

[57] ABSTRACT

A pneumatically operated welding machine particularly useful for welding small diameter wires onto pins for electronic circuitry is described. In such welding an insulated wire is fed through a hollow upper electrode for welding between the electrode and a pin. Equal pressures applied by the upper and lower electrodes first exert sufficient force for penetrating the plastic insulation and thereafter the force is reduced to an optimum level for welding. The upper and lower electrodes are connected to double acting pneumatic cylinders connected to a pneumatic circuit that sequentially brings the electrodes into light contact with the workpiece for lateral positioning, applies sufficient breakthrough force to penetrate the plastic insulation, applies a reduced force during a welding period and finally retracts the electrodes. Such light weight, low inertia, low friction, pneumatic electrode actuation provides balanced force between the electrodes and sufficient compliance that excellent welds are uniformly obtained irrespective of pin length or position.

6 Claims, 4 Drawing Figures

3,860,782
PATENTED JAN 14 1975
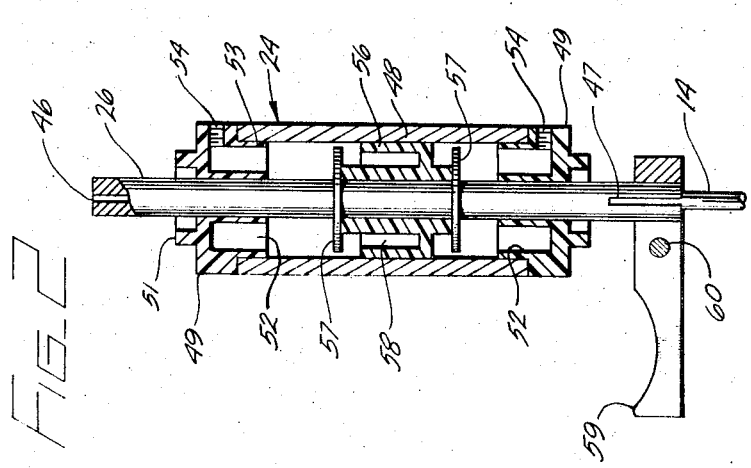
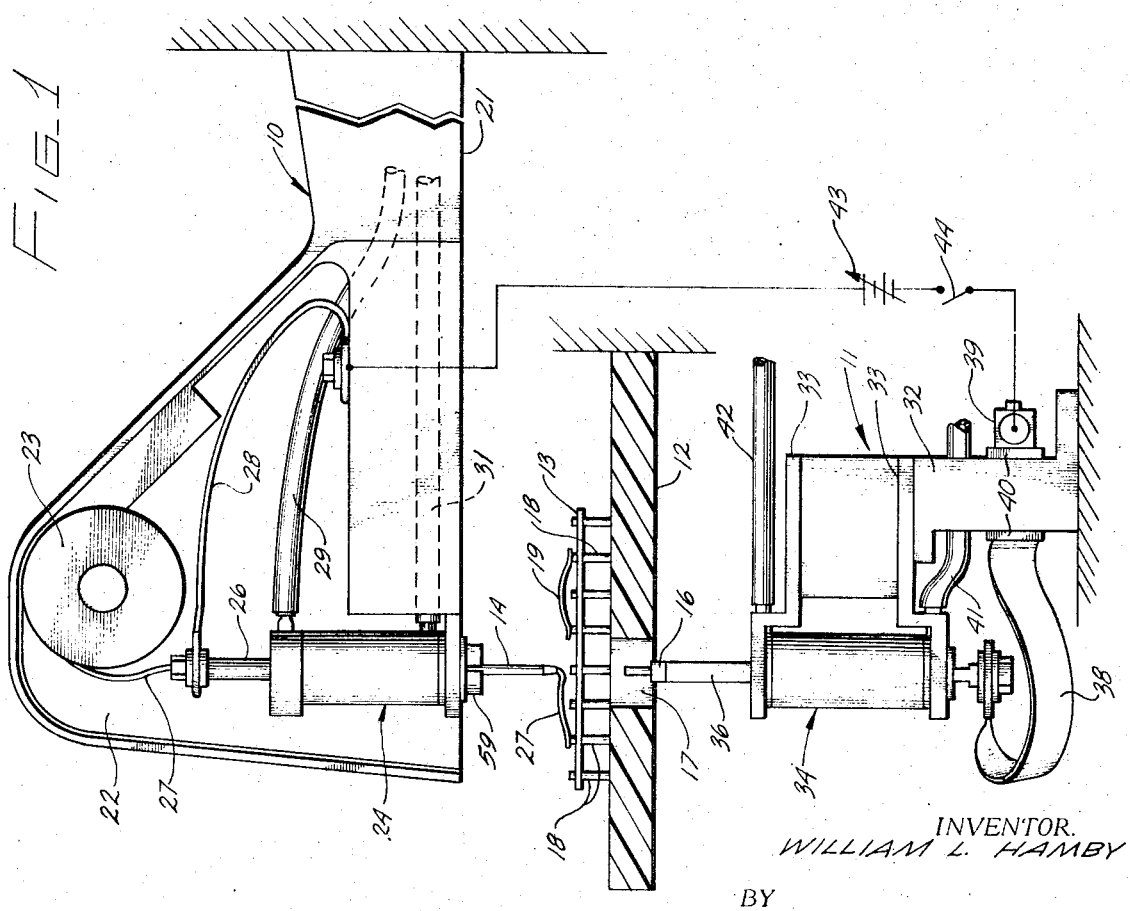
INVENTOR.
WILLIAM L. HAMBY

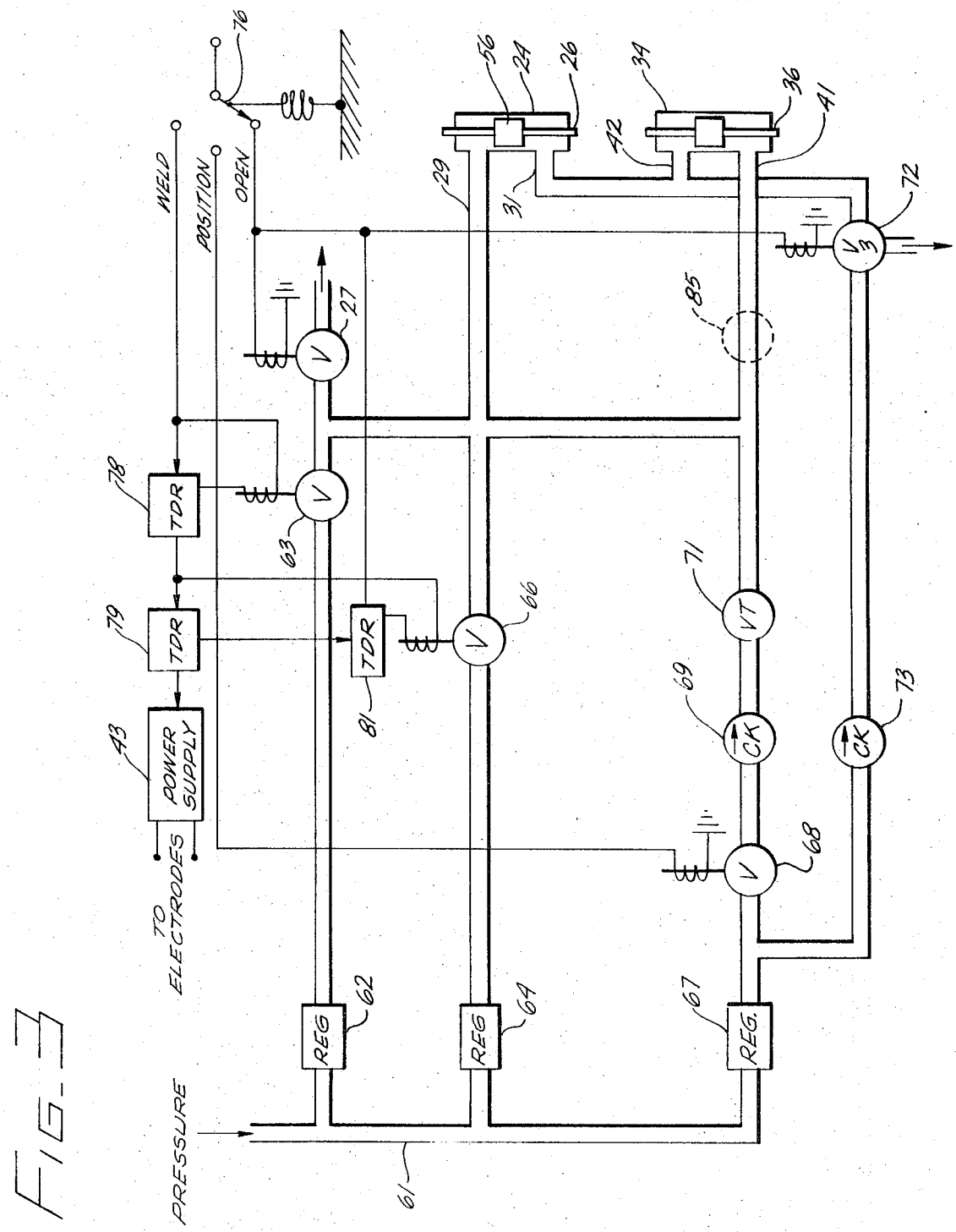

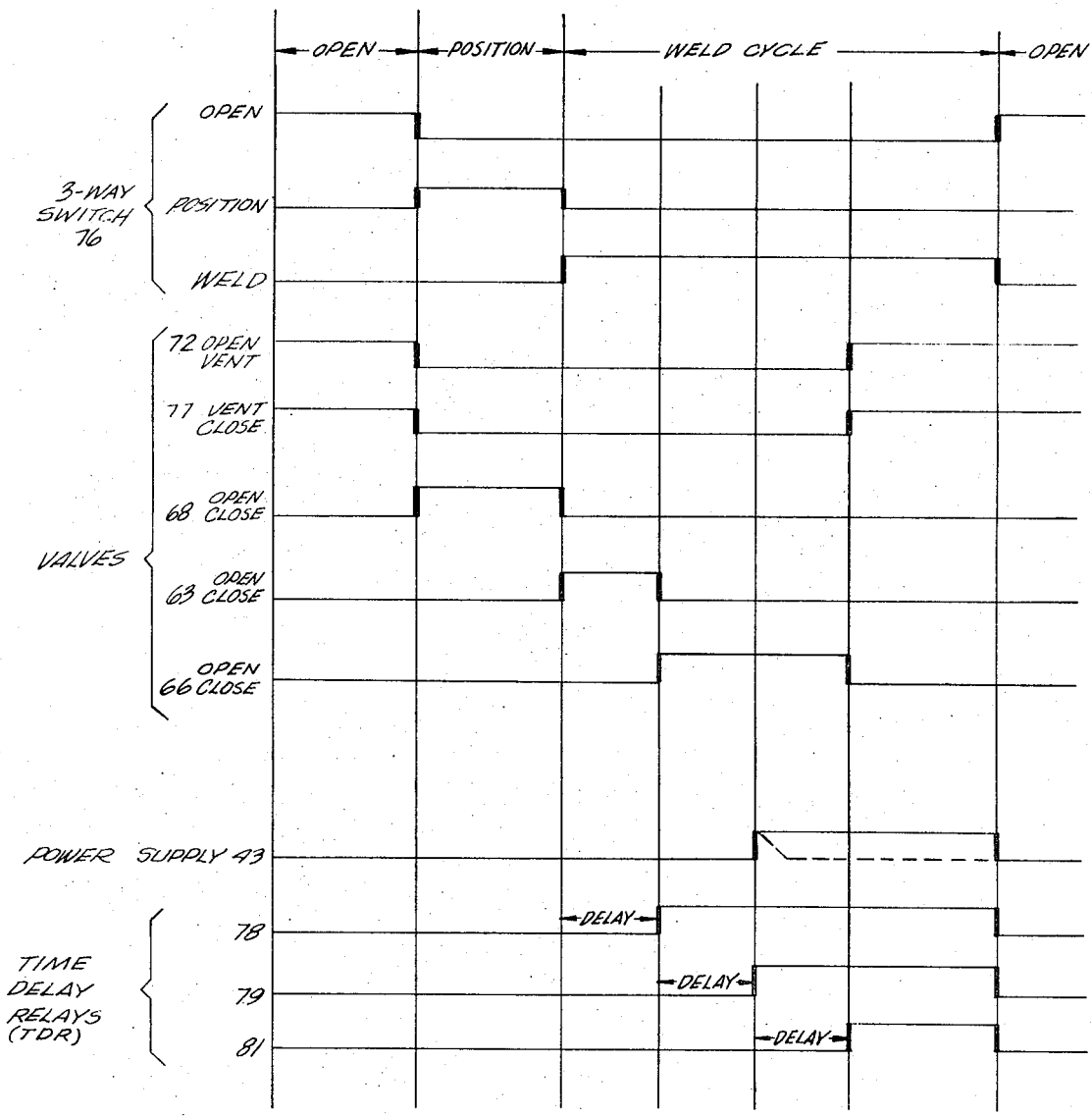

WELDING MACHINE

BACKGROUND

This invention is in the field of welding particularly as applied to welding of small diameter wires on pins for electronic circuitry. Many of the principles of such welding and mechanical apparatus for performing the welding operation are set forth in U.S. Pat. application Ser. No. 857,258, now U.S. Pat. No. 3,627,970 entitled "Method and Apparatus for Welding a Conductor Through Cold Flowable Insulation" by John F. Weatherman, Gary J. Walker and Larry R. Conley, now U.S. Pat. No. 3,627,970.

In many types of modern electronic circuitry, particularly those using integrated circuits, a non-conductive substrate or board is used for mounting the electronic circuit components. Such a board may have a large number of metal pins extending through the board for making electrical connections. Typically integrated circuit packages are connected by conventional means to the pins on one side of the board. On the opposite side the pins may be interconnected by wires welded directly to the ends of the pins. In such an arrangement a fine metal wire sheathed in plastic insulation is used. The plastic is "cold flowable" so that it plastically flows at room temperature when under stress.

The cold flow characteristics of the insulation are taken advantage of in the welding operation to avoid the necessity of mechanically stripping the insulation from the wire at the point where welding is desired. Typically the welding is done in a welding machine having a table or the like for supporting the circuit board. A lower electrode extends through an aperture in the table for engaging the lower end of a pin. An upper electrode is typically vertically movable for retraction away from the board and for contact with the end of the pin during a welding cycle. During operation a fine insulated wire is brought down through the hollow upper electrode and passes laterally at its lower end so that when the electrode is pressed downwardly the wire is pinched between the peripheral lip at the tip of the electrode and the end of the pin. Pressure on the electrode causes the plastic insulation to flow, bringing the wire into electrical contact with the electrode and the pin.

The pressure required to break through the plastic insulation is too high for welding since the heated wire would not have sufficient strength and could be penetrated by the electrode.

The pressure is therefore reduced to an optimum pressure for assuring good welding between the wire and the pin, and then a welding current is applied for a short time. As soon as the weld is made the pressure is relieved, the electrode retracted and the board translated to a new position with another pin between the electrodes. As the board is moved, wire is drawn through the hollow upper electrode for welding to the next pin so that wire can be "stitched" from pin to pin in any desired pattern.

Prior apparatus for such welding has employed a substantially fixed lower elecrode approximately flush with the table that supports the circuit board for making contact to the lower end of the pins. The upper electrode is mounted on a support structure that can slide vertically in the apparatus. This electrode is moved and pressure is applied by the upper electrode to the wire as the movable member is forced into position by a complex mechanism of cams, levers and springs.

Such a mechanism is subject to significant limitations for production line operations because of the inherent inertia of the relatively massive parts and the rigidity of the parts which makes them substantially unyielding. In order to counter such limitations it is necessary that the pins on a circuit board be of substantially uniform length and be uniformly positioned relative to the boards so that good contact is obtained with the lower electrode, and the desired pressures are applied by the upper electrode. In addition to being relatively unyielding, the high inertia of the relatively massive parts in the mechanical arrangements forces longer cycle times than desirable. Even though the entire welding cycle may be only in the order of seconds it should be recognized that thousands of such cycles may be covered in a day's time and relatively small time intervals accumulate as substantial cost elements.

It is, therefore, desirable to provide a welding apparatus having compliant electrodes for accommodating variations in pin position or length and for yielding during the welding operation. It is also desirable to provide a welding machine having a faster cycle time than has heretofore been available.

BRIEF SUMMARY OF THE INVENTION

Therefore in practice of this invention according to a presently preferred embodiment there is provided a pneumatic welding apparatus having a pair of opposed electrodes at least one of which is connected to a pneumatic actuator. Pressurized gas is supplied to the actuator with a first predetermined pressure sufficient to contact the electrode with an insulated conductor to be welded, without penetrating the insulation. Thereafter, pressurized gas is supplied to the actuator under a second predetermined pressure sufficient to press the electrode through the insulation. Then, pressurized gas is supplied to the actuator under a third predetermined pressure sufficient to maintain a desired welding force. Finally, the electrode is released from engagement with the wire to be welded.

DRAWINGS

These and other features and advantages of this invention will be appreciated as the same becomes better understood by reference to the following detailed description of a presently preferred embodiment when considered in connection with the accompanying drawings wherein:

FIG. 1 illustrates a portion of a pneumatic welding machine constructed according to principles of this invention;

FIG. 2 illustrates in cross section one pneumatic actuator for the apparatus of FIG. 1;

FIG. 3 illustrates schematically a pneumatic and electrical connection for the actuators of the welder; and FIG. 4 comprises a time diagram of operation of the welding machine.

DESCRIPTION

FIG. 1 illustrates in side view and partially schematically a portion of a welding machine constructed according to principles of this invention. The illustrated portion of the apparatus includes an upper electrode assembly 10 and a lower electrode assembly 11. A table 12 or similar workpiece receiving surface is provided between the upper and lower electrode assemblies. The electrode assemblies and table are for purposes of this invention rigidly attached to the balance of the welding apparatus which is not illustrated in any greater detail in FIG. 1. It will be apparent that adjustments may be provided in the apparatus for relative positioning of the assemblies and the table, however, during operation of the apparatus they are essentially fixed.

Typically, during operation of the welding machine, a circuit board 13 is placed on the table 12 in a position between an upper electrode 14 and a lower electrode 16. A clearance hole 17 is provided through the table 12 to permit passage of the lower electrode 16. It might be noted at this point that the board 13 may be manually positioned between the electrodes by a machine operator or, if desired, the board can be positioned by a mechanical X-Y positioner so that the board position is automatically controlled. For purposes of exposition it is considered that the board 13 is manually positioned between the electrodes.

As mentioned hereinabove the board typically includes metal pins 18 extending through the board. Typically the pins 18 are longer on one side of the board than on the other. Integrated circuit components (not shown) may be positioned between and connected to the longer ends of the pins 18. Wires 19 interconnect pins 18 on the opposite side of the board in any desired pattern. The wires 19 are welded to the short ends of the pins by the welding apparatus.

The upper electrode assembly 10 comprises an arm 21 connected to the balance of the apparatus and extending out over the table 12. At the outer end of the arm is an enlarged portion having an internal cavity 22. During normal operation the cavity 22 is covered by a cover plate which for purposes of illustration has been deleted from the drawing of FIG. 1. In the upper portion of the cavity 22 is a replaceable spool 23 on which insulated wire may be wound for dispensing in use of the apparatus. Below the spool 23 is a pneumatic cylinder 24, a cross section of which is presented in FIG. 2. A hollow piston rod 26 extends through the cylinder 24 and provides a mounting for the electrode 14. Wire 27 passes from the spool 23 through the hollow piston rod 26 and through the hollow electrode 14.

A flexible electrical lead 28 such as a braided strap is connected to the piston rod 26 at its upper end and is also connected directly to the arm 21. Since the voltages involved in practice of this invention are quite small it is convenient to use the arm as an electrical contact for one side of the circuit.

An upper air conduit 29 connects to the upper end of the pneumatic cylinder 24 and extends to a pneumatic circuit illustrated in greater detail in FIG. 3. A lower air conduit 31 is connected to the lower end of the pneumatic cylinder 24 and also is connected in the pneumatic circuit illustrated in FIG. 3.

The lower electrode assembly 11 comprises a Z-shaped bracket 32 mounted on the balance of the welding apparatus. A pair of similar mounting brackets 33 connected to the bracket 32 hold opposite ends of a lower pneumatic cylinder 34. A piston rod 36 extends through the pneumatic cylinder 34 for mounting the lower electrode 16. At the opposite end of the piston rod 36 is a flexible electrical lead 38 which is electrically connected to a terminal 39 mounted on the Z-shaped bracket 32. Insulators 40 are provided between the lead 38 and terminal 39 and the Z-shaped bracket 32 to prevent electrical shorting through the apparatus to the arm 21.

A lower pneumatic conduit 41 is connected to the lower end of the cylinder 34 and an upper pneumatic conduit 42 is connected to the upper end of the cylinder. These conduits connect to the circuit illustrated in FIG. 3.

Electrical connection for welding operations is illustrated schematically in FIG. 1 and comprises a variable power supply 43 typically provided with control of voltage, current and cycle time. A switch 44 connects the power supply 43 to the terminal 39 and the opposite side of the power supply is connected to the arm 21. Thus, when the electrodes 14 and 16 are in contact with opposite ends of a pin 18 a complete electrical circuit is formed when the switch 44 is closed. The switch 44 is only indicated schematically and may be a manually or automatically operated switch as may be appropriate.

FIG. 2 illustrates the pneumatic cylinder 24 in greater detail. It will be understood that the pneumatic cylinder 34 is substantially identical to the one illustrated in FIG. 2 with only such modifications to the piston rod as may be appropriate for the upper or lower electrodes respectively. Thus the upper piston rod 26 illustrated in FIG. 2 includes an axial passage 46 through which a wire 27 (FIG. 1) may pass to the lower electrode. At the lower end of the piston rod 26 a plurality of axially extending slits 47 are provided so that the end of the rod acts as a collet for holding the upper electrode 14. The lower piston rod 36 on the other hand, may be solid and have a threaded end for receiving the lower electrode 16.

As best seen in FIG. 2 the electrode assembly 24 has a cylindrical metal sleeve 48, the inside surface of which is preferably lapped to a fine finish and may be sealed with molybdenum sulfide or other suitable fine, lubricious material. Each end of the sleeve is closed by a plastic end cap 49 and the two end caps are substantially identical for economies of manufacture. A lip 51 on the outside of the end cap cooperates with the mounting brackets (for example, brackets 33, FIG. 1) for positioning and aligning the pneumatic cylinder. An annular recess 52 on the inside of the end cap leaves a thin lip 53 which fits within the sleeve 48 and forms a reasonable pneumatic seal particularly when internal pressure slightly bulges the plastic lip 53 outwardly against the sleeve. A transverse hole 54 through the side of the end cap communicates with the recess 52 and provides a place for mounting a conventional tube fitting (not shown) for connection to one of the air conduits 29 or 31 (FIG. 1). In this manner pneumatic pressure is introduced to the interior of the pneumatic cylinder.

The piston rod 26 passes through both end caps 49 and near its middle has a plastic piston 56. The piston 56 is held in place on the piston rod by a pair of snap rings 57. An annular recess 58 is formed on the side of the piston on which the larger pressure is typically applied so that the pressure within the recess tends to bulge the piston into sealing engagement with the interior wall of the sleeve 48 thereby minimizing air leakage.

It should be noted that the end caps 49 and the piston 56 are made of non-conductive material so that the piston rod 26 is electrically isolated and electrical contact is made thereto only by the flexible lead 28 (FIG. 1).

It should also be noted that the entire movable assembly connected to the electrode is very light weight. The only parts connected to the electrode include the piston rod and piston and a portion of the flexible lead 28 so that the total weight of the assembly is very low. Further, by providing a plastic piston made, for example, of polytetrafluoroethylene (Teflon) or the like, against the metal sleeve and particularly when additional lubricous material is used, a very low coefficient of friction is obtained.

A distinct advantage of a pneumatic system such as employed in practice of this invention is that the seal between the two sides of the piston need not be extremely good and some leakage of air can be tolerated. Likewise, the seal between the end caps and piston rod can be loose for low friction. Such air merely leaks into the environment with no harm and the absence of a requirement for tight sealing permits a very low friction contact between the piston and the sleeve and between the piston rod and the end caps. This is all of considerable importance in providing a very light weight, low inertia, low friction assembly connected to the electrodes so that they are compliant and can readily yield in response to dimensional changes upon heating the wire during the welding operation. The light weight, low inertia, low friction characteristics of the pneumatic cylinder for mounting the electrodes also permits very rapid response during the welding operation so that short weld cycles can be obtained.

A J-shaped handle 59 is provided around the upper piston rod 26 in the portion where the slits 47 are. A set screw 60 through the J-shaped handle clamps it together around the collet like end of the piston rod for securely holding the electrode 14 in position. In addition, the longer leg of the handle 59 extends laterally from the arm 21 so that a machine operator can use a finger to press the upper electrode down as desired. This permits the operator to gently press the upper electrode down so as to be more closely adjacent the end of a pin 18 in order to assure precise alignment of the pin with the electrode and thereby assure a good weld. It is found that some machine operators prefer to advance the electrode manually for at least some of the operations, while others prefer to use a pneumatic electrode advance, as hereinafter described, for guaranteeing precise positioning.

FIG. 3 illustrates schematically a pneumatic and electrical block diagram for operating a pneumatic welder constructed according to principles of this invention. As illustrated in FIG. 3 the pneumatic cylinders 24 and 34 and their accompanying pneumatic conduits 29, 31 and 41 and 42 are illustrated schematically for showing the pneumatic connections made thereto. The upper conduit 29 leading to the upper pneumatic cylinder 24 is connected to the lower conduit 41 leading to the lower pneumatic cylinder 34. Thus, when pneumatic pressure is applied it is supplied equaly to the two pneumatic cylinders which are substantially identical so that balanced forces are applied to the upper and lower electrodes. Similarly the lower conduit 31 to the upper electrode assembly and the upper conduit 42 to the lower pneumatic cylinder 34 are interconnected so that pneumatic pressure applied in a direction tending to retract both electrodes acts on both the upper and lower electrodes for simultaneously retracting them.

Pneumatic pressure is supplied to the circuit through a manifold 61 connected to any conventional air pressure supply (not shown) such as a small compressor, normal factory air or a cylinder of compressed air. A "breakthrough" regulator 62 connected to the manifold is a conventional adjustable gas pressure regulator which, during operation of the apparatus, is set at a pressure that applies a sufficient force on the electrodes to cause plastic flow or "breakthrough" of the plastic insulation surrounding the wire to be welded to a pin. The breakthrough regulator 62 is connected to the outer ends of the pneumatic cylinders 24 and 34 by a conventional "breakthrough" solenoid valve 63. The pressure applied for breakthrough is such that the force applied is very much greater than the weight of the movable elements connected to the electrodes. Thus, the electrode assembly including piston rod and piston may weigh only a few grams and the breakthrough force may be 10 pounds or more.

A "weld cycle" pressure regulator 64 is also connected to the input manifold 61. This too is a conventional adjustable pneumatic pressure regulator which, during operation of the apparatus, is set at a pressure optimum for obtaining a good weld between a wire and a pin. The weld cycle regulator 64 is connected to the outer ends of the pneumatic cylinders 24 and 34 by a "weld cycle" solenoid valve 66.

A "positioning" pressure regulator 67 is also connected to the inlet pressure manifold 61. This is a conventional adjustable pneumatic pressure regulator which, during operation of the apparatus, is typically set at a pressure that will move the electrode assemblies in the pneumatic cylinders without applying any substantial force by the electrodes against the pins. The positioning regulator 67 is connected to the outer ends of the pneumatic cylinders by a "positioning" solenoid valve 68. A check valve 69 is provided between the positioning regulator and the pneumatic cylinders to provide protection of the rather sensitive regulator when higher pressures are applied to the pneumatic cylinders.

A throttle valve 71 is also provided between the solenoid valve and the pneumatic cylinders so that the flow rate of air to the cylinders can be limited. Thus when the solenoid valve 68 is opened, air flows slowly into the outer ends of the pneumatic cylinders and the electrodes therefore relatively gradually approach the pins permitting a small amount of time for the operator to adjust position of a board before contact is actually made by the electrodes. In the absence of a throttling valve in this line there is a tendency for the electrodes to come together rather rapidly and in some circumstances this is deemed undesirable. The check valve and throttle may be combined if desired.

The positioning regulator 67 is also connected to the inner ends of the pneumatic cylinders 24 and 34 by way of a three-way "retraction" solenoid valve 72. A check valve 73 provides protection of the regulator 67. When the three-way solenoid valve 72 is opened, air pressure from the positioning regulator 67 is applied at the inner ends of the pneumatic cylinders so that the electrodes are pressed apart instead of together. When the three-way valve 72 is in its other position the inner ends of the pneumatic cylinders are vented to the environment.

FIG. 3 also illustrates in block form a portion of the electrical circuit used for operating the welding apparatus. A three-position switch 76 is spring-biased to an "open" position. It is found convenient to employ a foot operated switch so that the machine operator has both hands free to manipulate a circuit board. In automatic cycling an automatic three-position switch may be used. The switch 76 is arranged so that as it is actuated it first closes a "position" contact which can be held for any desired period. As the switch is further operated a "weld" contact is closed.

The "open" contact of the switch 76 is connected to the three-way solenoid valve 72 for setting the valve to a position wherein the pressure from the positioning regulator 67 is applied at the inner ends of the pneumatic cylinders. This tends to "open" the electrodes by biasing them away from each other. The "open" contact is also connected to a "vent" solenoid valve 77 that opens the outer ends of the pneumatic cylinders to the environment thereby relieving any pressure therein and permitting the relatively small pressure at the inner ends to drive the electrodes apart. Thus when the switch 76 is in the "open" position the electrodes are both retracted.

FIG. 4 illustrates in a timing diagram the positions of the various elements illustrated in FIG. 3. This diagram is plotted as a function of time increasing from left to right in a completely arbitrary scale and the time intervals suggested in FIG. 4 are only for convenience of illustration and do not suggest the actual relative time intervals. Thus the time interval identified as "position" may in some cases be several seconds or in others, a fraction of a second, and the entire weld cycle may occur in about a second. The various lines on the timing diagram of FIG. 4 are identified by the same numerical designation as the corresponding element in the schematic diagram of FIG. 3. Generally speaking the rise of one of the time lines corresponds to turning on or opening of the associated element and descending indicates closing or turning off of the corresponding element.

When the switch 76 is actuated to the "position" contact the vent solenoid valve 77 is closed, the positioning solenoid valve 68 is opened and the three-way solenoid valve 72 is switched so that the inner ends of the pneumatic cylinders are vented to the environment. This applies pneumatic pressure slowly through the throttle valve 71 to the outer ends of the pneumatic cylinder so that the electrodes gradually approach each other and make light contact with the ends of the pin so as to permit final precise positioning of the board if required.

When such positioning is completed the switch 76 is switched to the "weld" contact thereby closing the positioning solenoid valve 68. The breakthrough solenoid valve 63 is opened so that the breakthrough pressure from the regulator 62 is applied at the outer ends of the pneumatic cylinders pressing the electrodes towards each other with a force sufficient for causing plastic flow of the insulation around the wire and breakthrough for making electrical contact.

At the same time, power is applied to a conventional adjustable time delay relay 78 which can typically be set to operate after a time delay of from about one-half to thirty seconds. After the selected time delay the time delay relay 78 actuates and changes to its second position. Typically such a time deay relay may have multiple sets of contacts so that several functions can be performed by the time delay relay when it actuates. In this case the breakthrough solenoid valve 63 is connected to the time delay relay 78 so that when it actuates, this valve is closed and the breakthrough pressure on the electrodes is terminated. At the same time the welding cycle solenoid valve 66 is opened so that pneumatic pressure from the welding cycle regulator 64 is applied to the outer ends of the pneumatic cylinders.

It will be noted that the somewhat higher pressure required for breakthrough is not relieved in order to permit the lower welding pressure to be applied. Instead because of the inherent leakage around the pistons in the pneumatic cylinders and around the piston rod where it passes through the end caps, air leakage provides sufficient venting and pressure relief that the pressure drops to the required welding pressure in a reasonable time, typically a fraction of a second. In order to keep this time short it is preferred to have the pressure containing volume of the system as small as possible. It will also be apparent that if desired momentary venting can also be used for more rapidly bringing the pressure down to the desired range for welding.

In addition to closing the breakthrough solenoid valve 63 and opening the welding cycle solenoid valve 66 the time delay relay 78 applies power to a second time delay relay 79. This time delay relay permits sufficient time to elapse for the pressure applied in the pneumatic cylinders to drop the desired pressure for welding. When the second time delay relay 79 actuates after a selected time interval, power is applied to the power supply 43 for supplying the welding power between the electrodes. As seen in FIG. 4 power is ON to the power supply for an appreciable period; however, as indicated by the dashed line, the actual application of power between the electrodes occupies only a portion of the total time interval due to the characteristics of the power supply itself which preferably has an adjustable time interval for selecting a desired time appropriate for welding a particular type of wire. If desired the welding power pulse can be applied while pressure is dropping from the breakthrough valve. When this is done, the elastic properties of the system apparently are exerting sufficient force that the piston is in slight motion and static friction forces need not be overcome. This enhances compliance of the system and excellent welds are obtained.

When the second time delay relay 79 actuates it also applies power to a third time delay relay 81. This third time delay relay provides a sufficient time interval for the welding pulse from the power supply and the short cooling time required before pressure should be relieved from the electrodes. When the third time delay relay 81 actuates, the welding cycle solenoid valve 66 is closed and the vent solenoid valve 77 is opened so that pressure at the outer ends of the electrodes is vented to the environment. At the same time the three-way solenoid valve 72 is switched so that pressure from the positioning regulator 67 is applied to the inner ends of the pneumatic cylinders for biasing the electrodes away from each other. This complets one full welding cycle and the switch 76 is then released to return to the "open" contact. As mentioned this leaves solenoid valve 72 and 77 open to retain the electrodes in their retracted positions. The circuit board can then be translated to a new position for making a new weld.

The use of pneumatic pressure for actuating the electrodes is highly advantageous in construction and operation of the electrode cylinders. If hydraulic cylinders were used many additional problems and limitations would be imposed. Like prior mechanical systems, a hydraulic system has very little yield or compliance to variations in dimensions. Leakage of hydraulic fluid cannot be tolerated on electronic circuitry and therefore expensive and tight seals would be needed. With such tight seals high friction forces are present. Air pressure can be permitted to leak around the piston and between the end caps and piston rod without contamination. Light seals with very low friction can then be used. Likewise, air pressure can be applied and released more rapidly than hydraulic pressure where moderate stroke of the piston is involved. Both factors make a pneumatic system superior in speed and cleanliness and in compliance to changing dimensions during the welding cycle.

Although but one embodiment of pneumatic welding machine constructed according to principles of this invention has been described and illustrated in detail herein, it will be apparent that many modifications and variations can be made by one skilled in the art, thus, for example, other configurations of pneumatic cylinder can be employed for actuating the electrodes with a force that is substantially greater than the mass of the moving elements connected to the electrodes. Various other valving and switching arrangements for providing the desired sequence of operations can also be provided. Various valves can be combined as three-way valves or the like for sequential operation. A solenoid valve 85 (show in phantom in FIG. 3) can be used in the line to the lower electrode so that positioning of the board with only the upper electrode extended can be used if desired. A light spring can be provided in each cylinder between the piston and the end of the cylinder adjacent the other so that the pistons are biased apart. The inner ends of the cylinders can then remain vented and retraction of the pistons occurs automatically when the outer ends of the cylinders are vented. The positioning, breakthrough and welding pressures are then increased enough to overcome the spring bias. Many other modifications and variations will be apparent to one skilled in the art and it is therefore tobe understood that within the scope of the appended claims the invention may be practiced otherwise than as specifically described.

What is claimed is:

1. A pneumatic welder for welding a conductor through a cold flowable insulation comprising:
   a pair of opposed electrodes;
   a pneumatic actuator connected to one of the electrodes for imparting movement thereto towards the other electrode;
   manifold means for connection to a source of pressurized gas;
   position pressure means connected to the manifold means for supplying the gas to the actuator under a first predetermined sufficient pressure to contact the electrode attached thereto with an insulated conductor to be welded without penetrating the insulation;
   breakthrough pressure means connected to the manifold means for supplying the gas to the actuator under a second predetermined sufficient pressure to press the electrode attached thereto through the insulation around the conductor sequentially after the positioning pressure means;
   weld cycle pressure means connected to the manifold means for supplying the gas to the actuator under a third predetermined sufficient pressure to maintain a desired welding force sequentially after the breakthrough pressure means; and
   release means coupled to the one electrode for moving the electrodes apart.

2. A pneumatic welder as defined in claim 1 wherein the release means comprises pressure means connected to the manifold means for supplying the gas to the actuator under a predetermined sufficient pressure for moving the electrodes apart.

3. Pneumatic apparatus for welding a conductor through cold flowable insulation surrounding the conductor to a desired workpiece comprising:
   a. a pair of electrodes for engaging the conductor and the workpiece respectively,
   b. means for engaging the electrodes in separate contact with the workpiece and the conductor and including a pneumatic actuator connected to at least the conductor electrode for imparting desired movement to the conductor electrode, the actuator comprising:
      i. position pressure means coupled to the pneumatic actuator for supplying gas to the actuator under sufficient pressure to move the conductor electrode into engagement with an insulated conductor to be welded and to move the conductor into engagement with the workpiece,
      ii. breakthrough pressure means coupled to the pneumatic actuator for supplying gas to the actuator under a sufficient pressure to press the conductor electrode through the insulation into contact with the conductor and to press the conductor through the insulation into contact with the workpiece sequentially after operation of the position pressure means, and
      iii. weld cycle pressure means coupled to the pneumatic actuator for supplying gas to the actuator under a sufficient pressure to maintain a desired welding force between the conductor and the workpiece sequentially after operation of the breakthrough pressure means; and
   c. release means coupled to at least the conductor electrode for disengaging the electrodes from the conductor and the workpiece.

4. A pneumatic welder for welding a conductor through a cold flowable insulation comprising:
   a pair of opposed electrodes;
   a first pneumatic actuator connected to one of the electrodes for imparting movement thereto towards the other electrode;
   a second pneumatic actuator connected to the other electrode for imparting movement thereto towards the one electrode;
   manifold means for connection to a source of pressurized gas;
   position pressure means connected to the manifold means for supplying gas to both actuators under first predetermined sufficient pressure to contact the one electrode with an insulated conductor to be welded;
   breakthrough pressure means connected to the manifold means for supplying gas to both actuators under a second predetermined sufficient pressure to press the one electrode through the insulation around the conductor sequentially after the positioning pressure means;
   weld cycle pressure means connected to the manifold means for supplying gas to both actuators under a third predetermined sufficient pressure to maintain a desired welding force sequentially after the breakthrough pressure means; and release means coupled to the one electrode for moving the electrodes apart.

5. A pneumatic welder as defined in claim 4 wherein each actuator comprises:
a cylinder;
end caps on each end of the cylinder;
a slidably movable piston rod extending through the two end caps;
a piston fixed on the piston rod in the cylinder for dividing the interior thereof into two chambers;

means on an end of the piston rod for attaching an electrode thereto; and
a flexible electrical lead having an end connected to the piston rod, and wherein the combined weight of the piston, piston rod, electrode and lead is very small relative to the force exerted on the electrode by the breakthrough pressure means.

6. A pneumatic welder as defined in claim 5 wherein one of the piston rods and one of the electrodes are hollow for passing an insulated conductor wire therethrough.

* * * * *